United States Patent [19]
Humphreys

[11] Patent Number: 6,158,674
[45] Date of Patent: Dec. 12, 2000

[54] LIQUID DISPENSER WITH MULTIPLE NOZZLES

[76] Inventor: Ronald O. Humphreys, N95W26157 Hwy Q, Colgate, Wis. 53017

[21] Appl. No.: 09/301,288

[22] Filed: Apr. 28, 1999

[51] Int. Cl.[7] .............................. A62C 11/00; B05B 1/14; B65D 88/54; G01F 11/06
[52] U.S. Cl. ...................... 239/333; 239/559; 222/321.6; 222/321.9
[58] Field of Search .................. 239/333, 337, 239/339, 558, 559, 561; 222/205, 321.1, 321.6, 321.8, 321.9, 321.7, 385; 141/20.5

[56] References Cited

U.S. PATENT DOCUMENTS

| | | |
|---|---|---|
| 2,470,881 | 5/1949 | Zimbelman ......................... 239/559 X |
| 2,726,897 | 12/1955 | Dupont ............................... 239/559 X |
| 3,628,733 | 12/1971 | Kahn ...................................... 239/337 |
| 4,314,657 | 2/1982 | Perakis et al. . |
| 4,535,918 | 8/1985 | Heiligman et al. . |
| 4,586,429 | 5/1986 | Hawkins . |
| 4,629,098 | 12/1986 | Eger . |
| 4,964,548 | 10/1990 | Kenyon, Jr. . |
| 5,236,022 | 8/1993 | Husted . |
| 5,358,179 | 10/1994 | Lund et al. ............................. 239/333 |
| 5,397,028 | 3/1995 | Jesadanont . |
| 5,642,762 | 7/1997 | Greenberg et al. . |

*Primary Examiner*—Andres Kashnikow
*Assistant Examiner*—Davis Hwu
*Attorney, Agent, or Firm*—Boyle, Fredrickson, Newholm, Stein & Gratz

[57] ABSTRACT

A liquid dispenser comprises a pumping assembly attached to a liquid storage container. The pumping assembly includes an outlet port for dispersing liquid from the container. The outlet port includes a plurality of channels that communicate with a plurality of orifices through which a liquid is dispensed to an exterior of the storage container. The orifices arranged are in two series of concentric rings.

21 Claims, 3 Drawing Sheets

LIQUID DISPENSER WITH MULTIPLE NOZZLES

BACKGROUND OF THE INVENTION

This invention relates generally to liquid dispensers and, more particularly, to a portable dispenser for evenly dispensing a liquid from multiple dispensing nozzles.

Dispensing devices are commonly used for delivering a variety of substances such as soaps, lotions, cleaning solutions, chemicals, and the like. Various liquid dispensers exist which employ a manually actuated pump mechanism for forcing a volume of liquid from an intake chamber to a single outlet nozzle such as an aerosol spray nozzle. Although assumably effective in operation, such devices are not sufficiently adapted for a dispensing application requiring a liquid to be dispensed simultaneously from a plurality of nozzles.

Therefore, it is desirable to have a liquid dispenser that dispenses a predetermined quantify of a liquid through a plurality of nozzles simultaneously. It is further desirable to have a dispenser that is manually actuated when pressure is applied to a cap portion of a container.

SUMMARY OF THE INVENTION

Accordingly, I have invented a liquid dispenser which utilizes a pumping assembly mounted to a liquid storage container. The pumping assembly includes an outlet port connected to a plurality of channels housed within a cap portion of the dispenser. The cap portion includes a top surface having a plurality of nozzles extending therethrough with each nozzle being coupled to one of the channels. Each nozzle presents a relatively narrow diameter for constricting liquid being dispensed therethrough such that the liquid is dispensed uniformly.

It is therefore a general object of this invention to provide a liquid dispenser which dispenses liquid through multiple nozzles simultaneously.

Another object of this invention is to provide a dispenser, as aforesaid, which dispenses liquid uniformly through each nozzle.

A further object of this invention is to provide a dispenser, as aforesaid, which draws liquid into an intake chamber from a reservoir and then pumps the liquid from the chamber through the nozzles upon user actuation of a pump assembly.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
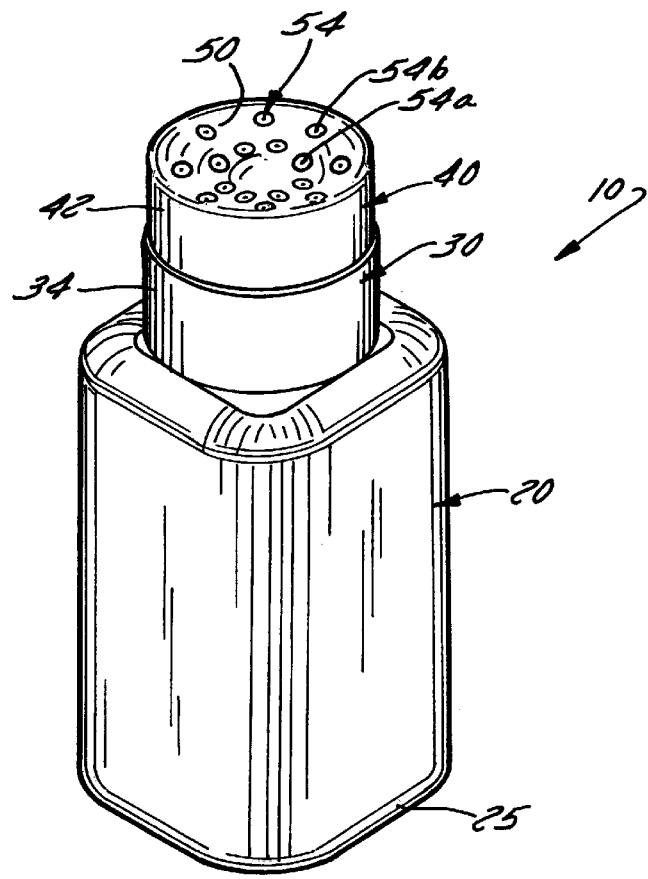
FIG. 1 is a perspective view of the liquid dispenser according to the present invention.
Figure 3:
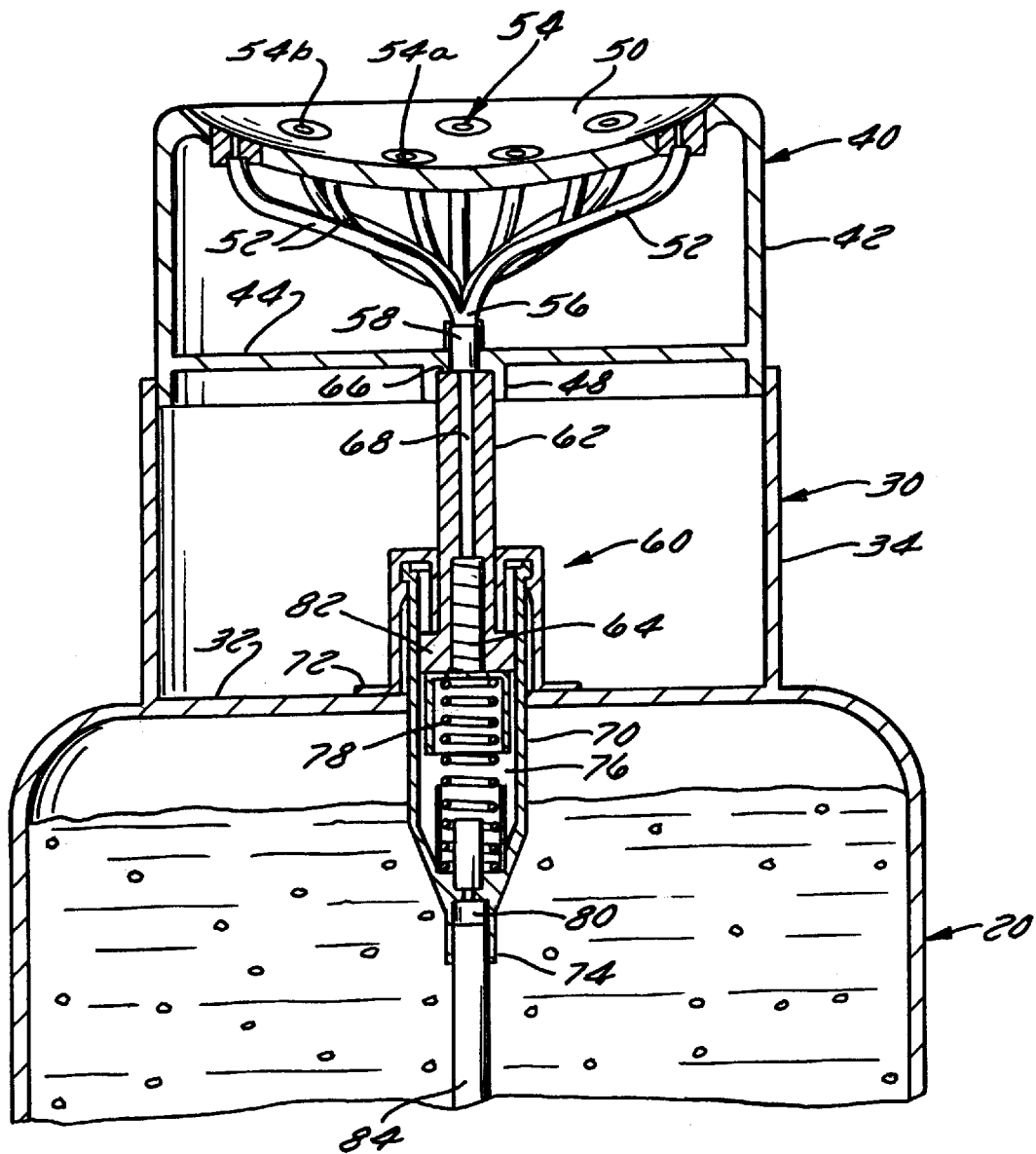
FIG. 3 is a sectional view of the dispenser taken along line 3—3 of FIG. 2 with the plunger in a rest position.
Figure 4:
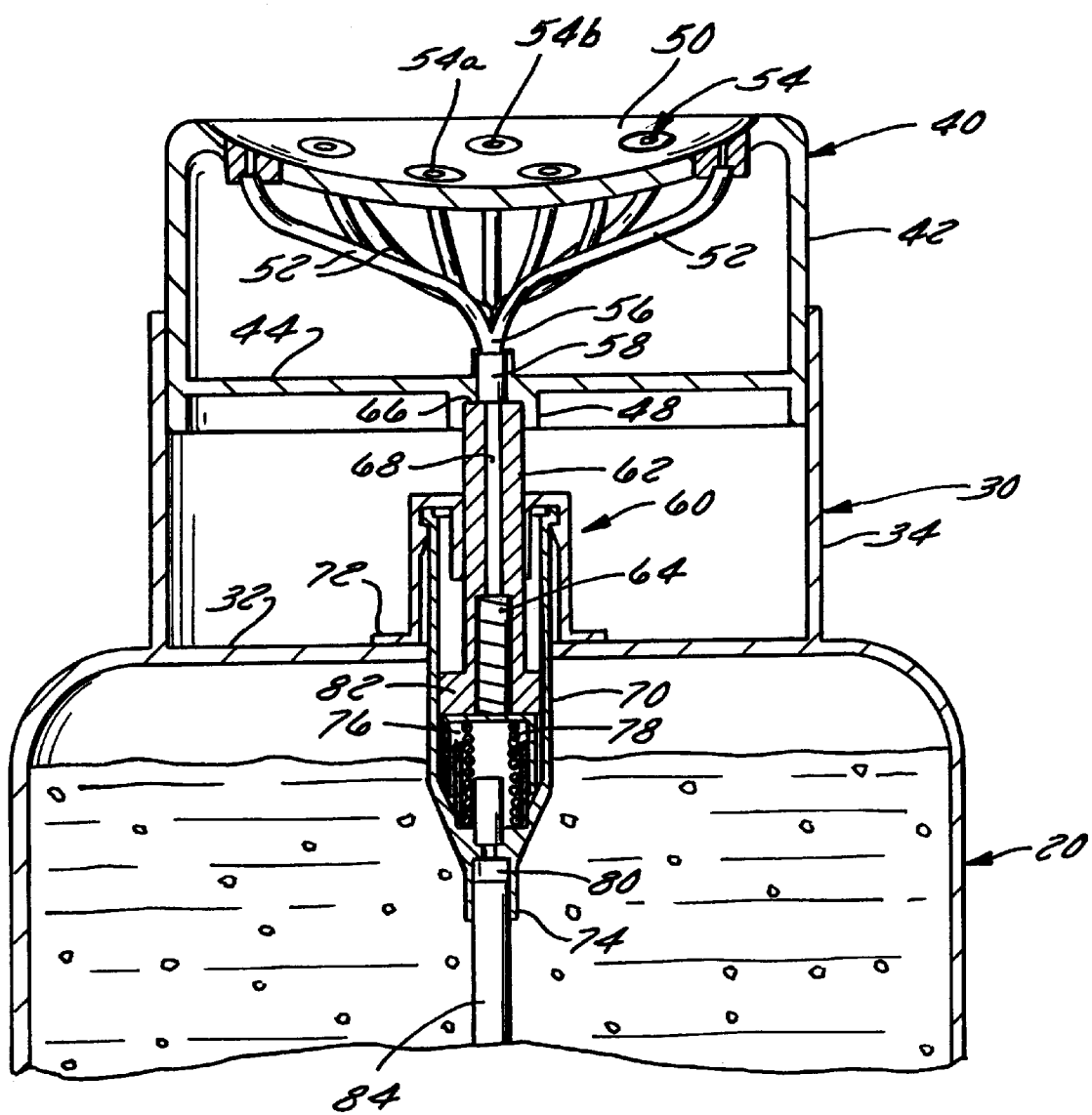
FIG. 4 is a view of the dispenser of FIG. 3 with the plunger in a compressed position.

Turning more particularly to the drawings, FIG. 1 shows the preferred embodiment of the liquid dispenser 10. The dispenser 10 includes a bottle-shaped liquid container 20 constructed of polypropylene, polyethylene, or any other suitable material. The container 20 includes a generally rectangular base 25 which allows the container 20 to be positioned in a stable, upright position during storage or use. A neck portion 30 is fixedly attached to the container 20 and includes a bottom wall 32, an upstanding cylindrical side wall 34 extending therefrom and an open top (FIGS. 3 and 4). The dispenser 10 further includes a cap or cover 40 having an upstanding cylindrical side wall 42 normally extending from a bottom wall 44. A concave or bowl shaped top surface 50 extends between edges of the cap side wall 42 to prevent spillage of a liquid dispensed from the container 20. The cap side wall 42 presents a diameter that is slightly smaller than the diameter of the side wall 34 of the neck portion 30 such that the cap 40 is slidable therein.

The dispenser 10 further includes a pump assembly 60 for pumping liquid from the container 20. Preferably, a reciprocating piston pump is utilized although other pumping means are known in the art. The pump assembly 60 includes a plunger 62 that is movable within a cylindrical barrel 70, the barrel 70 forming an intake chamber 76. The barrel 70 extends through an aperture in the bottom wall 32 of the neck portion 30 and includes a flange 72 fixedly attached thereto. The plunger 62 includes a lower end 64 and an upper end 66 with a passage 68 extending axially therebetween. The lower end of the passage 68 lies immediately adjacent the intake chamber 76 and selectively communicates therewith as to be further described below.

Figure 2:
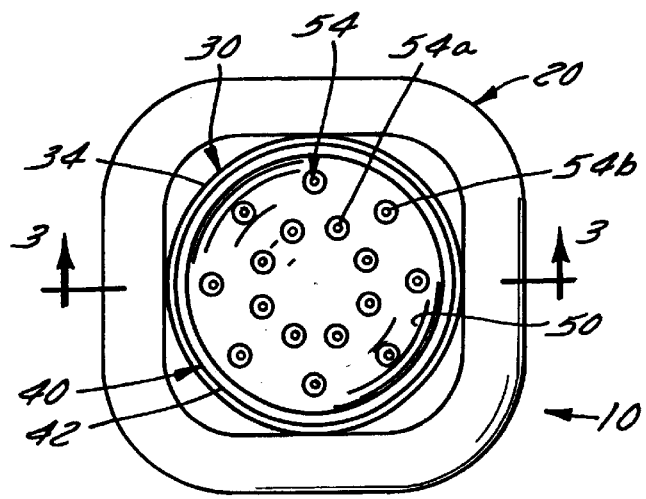
FIG. 2 is a top view of the dispenser of FIG. 1.

The cap 40 includes a plurality of channels 52, the upper end of each channel 52 being coupled to a separate nozzle or orifice 54 extending through the upper surface 50 of the cap 40 (FIGS. 2 and 3). Lower ends of the channels 52 are joined into a singular channel connector 56 that is fixedly connected to an outlet port 58. The outlet port 58 includes a bore for communicating the passage 68 with the singular channel connector 56. The bottom wall 44 of the cap 40 includes a hemispherical flange 48 that is releasably coupled to the upper end 66 of the plunger 62.

The nozzles 54 are spaced apart about an imaginary central longitudinal axis extending through the cap 40. A first/inner series or circle of nozzles 54a is positioned substantially adjacent the central longitudinal axis and a second/outer series of nozzles 54b is positioned adjacent the peripheral edge of the top surface 50. The series thereby form concentric circles about the longitudinal axis. Each nozzle 54 presents a relatively small diameter to constrict liquid dispensed therethrough. It is understood, however, that nozzles 54b within the second/outer series present diameters smaller than the diameters of nozzles 54a within the first/inner series such that liquid is dispensed with equal velocity through all nozzles 54 regardless of the fact that the length of the channel 52 transmitting liquid from the pump assembly 60 to a second series nozzle 54b is longer than that of a first series nozzle 54a.

When pressure is exerted on the cap 40, the cap 40 forces the plunger 62 downward within the barrel 70 (FIG. 4). As the plunger 62 extends downwardly, the intake chamber 76 decreases in volume and correspondingly increases the pressure therein. An inlet valve 80 provided at the lower end 74 of the barrel 70 closes under this increase in pressure to prevent liquid from being drawn into the intake chamber 76 from the container 20. The increase in chamber pressure, however, causes the outlet valve 82 at the lower end 64 of the plunger 62 to open, thus placing the intake chamber 76 in communication with the passage 68. Liquid previously held within the intake chamber 76 is then delivered under pressure through the outlet port 58 and channels 52 to the cap nozzles 54. The plurality of nozzles 54 allow a large or wide surface area to be uniformly covered with the liquid, e.g. a cloth used for cleaning.

When the plunger 62 is fully depressed or pressure is released from the cap 40, a compression spring 78 pushes the plunger 62 in an upward direction, returning the dispenser to its FIG. 3 configuration. This return movement of the plunger 62 causes an increase in the volume of the intake chamber 76 and causes the outlet valve 82 to close. As the plunger 62 is drawn upward within the barrel 70 with the outlet valve 82 closed, a negative pressure or vacuum is created which draws liquid into the intake chamber 76 through the siphon tube 84 and inlet valve 80. With the intake chamber refilled, the liquid dispenser 10 is again ready to be actuated.

Accordingly, it can be seen that the liquid dispenser 10 can dispense a liquid from a container 20 to a plurality of nozzles 54 simultaneously and uniformly according to manual actuation of a pump assembly 60.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A liquid dispenser, comprising:
   a container for storing a liquid having a top and a bottom;
   means for pumping attached to an end of said container;
   a cover attached to the top of the container; and
   said means for pumping including an outlet means for dispensing a liquid from within said container, said outlet means having an outlet port connected to a plurality of outlet channels and having a plurality of outlet orifices located on a top surface of said cover through which a liquid is dispensed to an exterior of said container, said orifices in communication with said channels.

2. A liquid dispenser as claimed in claim 1 wherein said orifices are formed through a cover of said means for pumping.

3. A liquid dispenser as claimed in claim 1 wherein said orifices have a relatively small diameter to constrict an amount of liquid being dispensed therethrough.

4. A liquid dispenser as claimed in claim 1 wherein each one of said orifices first communicates with one of said plurality of channels.

5. A liquid dispenser as claimed in claim 1 wherein said container has a broad, rectangular base at the bottom of the container to allow upright positioning of said container.

6. A liquid dispenser as claimed in claim 1 wherein said means for pumping is a reciprocating piston pump.

7. A liquid dispenser as claimed in claim 2 wherein said cover is concave to prevent spillage of a liquid dispensed outside of a radius of the cover of said container.

8. A liquid dispenser as claimed in claim 1 wherein said plurality of orifices includes a first inner series and a second outer series extending about said cover, said first series and said second series being concentric about a longitudinal axis of said dispenser.

9. A liquid dispenser as claimed in claim 8 wherein each said orifice of said second series has a diameter smaller than the diameter of each said orifice of said first series and their associated channels are of a longer length than the length of the channels associated with the first series to ensure an amount of liquid is dispersed with equal velocity over an area through said plurality of orifices.

10. A liquid dispenser as claimed in claim 1 wherein at least one said orifice has a first diameter and at least another said orifice has a second diameter.

11. A liquid dispenser, comprising:
    a container having a rectangular base for storing a liquid;
    means for pumping attached to an end of said container;
    and said means for pumping including a cover and an outlet means for dispensing a liquid from within said container, said outlet means having an outlet port connected to a plurality of outlet channels and having a plurality of outlet orifices through which a liquid is dispensed to an exterior of said container, each one of said orifices first communicating with one of said plurality of channels;
    said orifices having a relatively small diameter to constrict an amount of liquid being dispensed therethrough and being formed through said cover of said means for pumping;
    said cover being concave to prevent spillage of a liquid dispensed from said container.

12. A liquid dispenser as claimed in claim 11 wherein said plurality of orifices includes a first inner series extending about said cover and a second outer series extending about said cover, said first series and said second series being concentric about a longitudinal axis of said dispenser.

13. A liquid dispenser as claimed in claim 12 wherein each orifice of said second series has a diameter smaller than the diameter of each orifice of said first series.

14. A liquid dispenser as claimed in claim 11 wherein said means for pumping is a reciprocating piston pump.

15. A liquid dispenser, comprising: a storage container; means for pumping attached to said container; said means for pumping including an outlet means for dispersing a liquid stored within said container; said outlet means having a plurality of outlet channels that communicate with a plurality of orifices arranged in a circle and which extend through a cover of said means for pumping; said orifices being spaced apart substantially throughout an area of said cover to disperse a liquid dispensed from within said container.

16. A liquid dispenser as claimed in claim 15 wherein said orifices have a relatively small diameter to constrict an amount of liquid being dispersed therethrough.

17. A liquid dispenser as claimed in claim 15 wherein said cover is concave to prevent spillage of a liquid dispensed outside of a radius of the cover of said container.

18. A liquid dispenser as claimed in claim 15 wherein said plurality of orifices includes a first and a second outer series extending about a longitudinal axis of said cover, said first series and said second series being concentrically spaced apart about a longitudinal axis of said dispenser.

19. A liquid dispenser as claimed in claim 18 wherein each orifice of said second series has a diameter smaller than the diameter of each orifice of said first series and their associated channels are of a longer length than the length of the channels associated with the first series to ensure an amount of liquid is dispersed with equal velocity over an area through said plurality of orifices.

20. A liquid dispenser as claimed in claim 15, wherein said orifices are arranged on a top surface of the cover in an inner ring having at least four orifices and an outer ring having at least four orifices to ensure thorough dispersement of a liquid when the cover of the container comes in contact with an object and the pumping means is depressed.

21. A liquid dispenser as claimed in claim 15, wherein said container further comprises a side wall and a neck; said side wall having a diameter smaller than that of a diameter of said neck so as to hold said cover in place once said cover is slid therein; and wherein said cap includes a hemispherical flange and a plunger, said flange being releasably coupled to said plunger.

* * * * *